Figure 1:
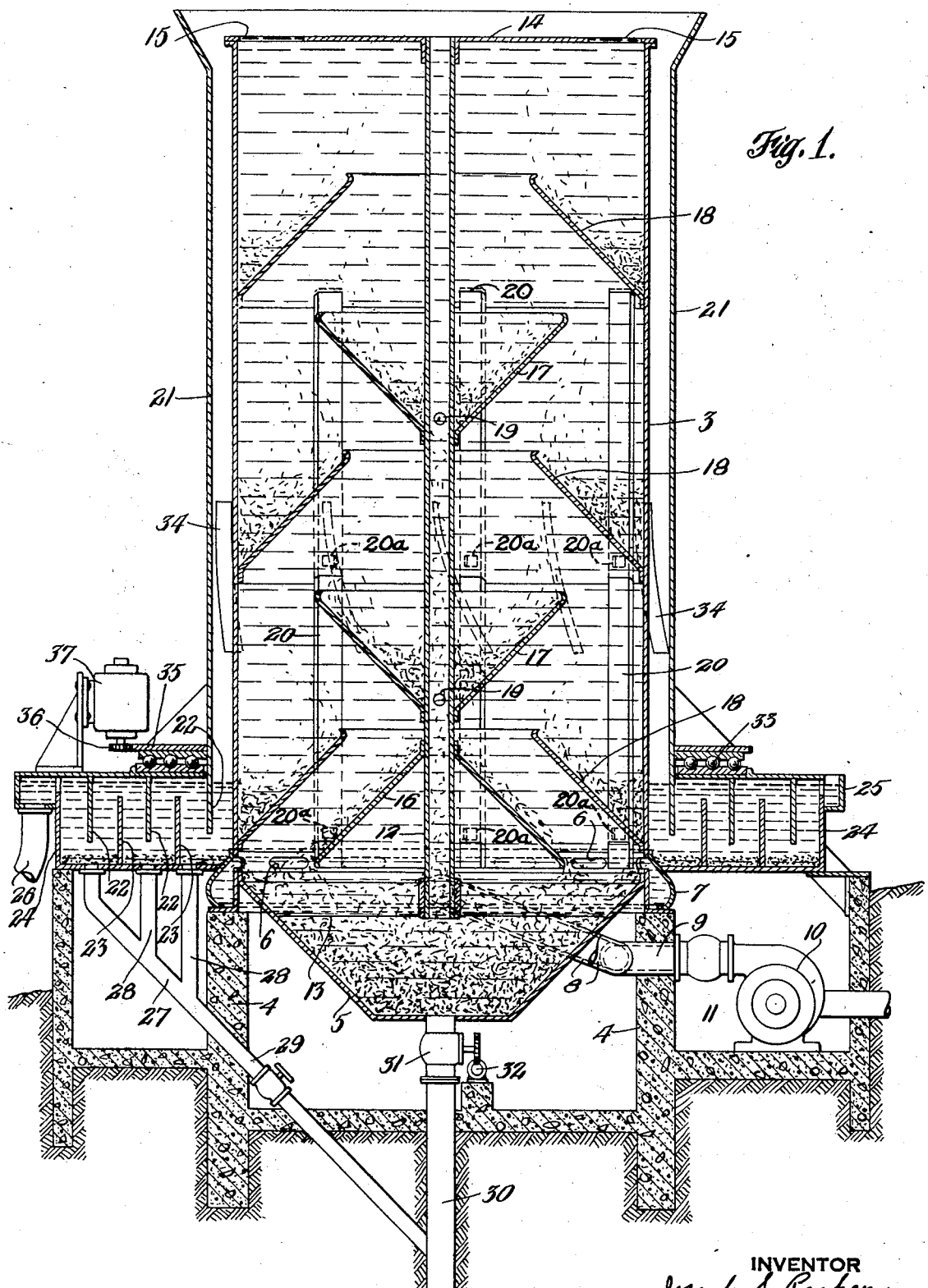

Feb. 4, 1941.  J. S. PECKER  2,230,386
SEPARATION OF SOLIDS FROM LIQUIDS
Filed Aug. 12, 1937  2 Sheets-Sheet 1

INVENTOR
Joseph S. Pecker
BY
Synnestvedt & Lechner
ATTORNEYS

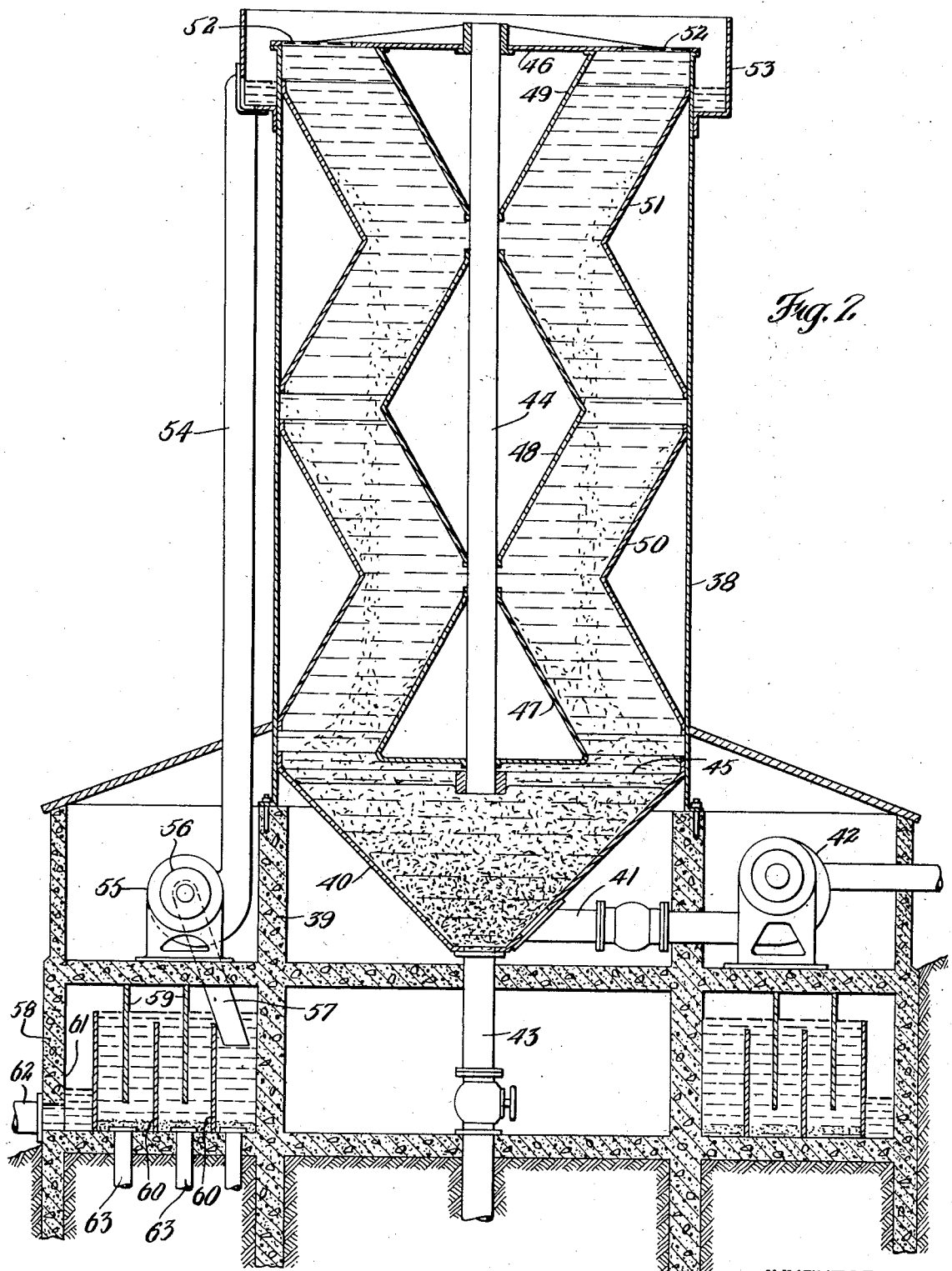

Patented Feb. 4, 1941

2,230,386

UNITED STATES PATENT OFFICE 2,230,386

SEPARATION OF SOLIDS FROM LIQUIDS

Joseph S. Pecker, Philadelphia, Pa., assignor to American Centrifugal Corporation, New York, N. Y., a corporation of Delaware Application August 12, 1937, Serial No. 158,673

3 Claims. (Cl. 210—58)

This invention relates to a method of and equipment for settlement of solids from mixed solid and liquid materials.

The invention is especially concerned with a method of and equipment for handling mixed solid and liquid materials in which the solids content represents only a minor fraction of the total volume. Stated in another way, the invention provides for concentration of solids or slurries from relatively dilute mixtures of liquids and solids.

The method and equipment are suitable for use in various industries, such as the paper making industry, the mining industry, and also in sewage disposal. For convenience, the following description is related particularly to the adaptation of the invention to sewage disposal, in which connection it is also illustrated in the drawings.

One of the primary objects of the invention is to provide for settlement of solids from dilute mixtures in a continuous manner, preferably utilizing the action of gravity to effect settlement or concentration of the sludge or slurry.

Preferably, although not essentially, the invention contemplates the employment of a gravity settlement tank of greater overall height than diameter or horizontal dimension thereof, in which tank the mixed materials are introduced at a point toward the bottom and caused to flow upwardly therethrough to overflow at the top. The invention also contemplates means providing a flow path through the tank which is relatively shallow in a direction paralleling the action of centrifugal force, whereby solids need be separated by the action of gravity through only a relatively shallow depth of liquid. This provides for rapid settlement action even when the tank is of considerable height, and further is of importance in permitting continuous flow or operation.

At the same time the invention also accomplishes another important object, i. e., the conservation of space which, in many situations, such as sewage disposal plants, is of material consequence.

A further object of the invention is involved in the provision of means for generating power from the overflow materials from the tank. This is of especial importance and advantage in an installation where the tank is quite high because of the resulting substantial drop of the overflow materials. The power generated may be employed for any desired purpose, as for example to aid in the driving of a pump for introducing the mixed materials into the tank for settlement therein.

How the foregoing objects and advantages, together with others which will occur to those skilled in the art, are attained, will be more apparent from a consideration of the following description referring to the accompanying drawings, in which—

Figure 1 is a vertical sectional view through a settlement tank for a sewage disposal plant, the tank and associated parts being constructed in accordance with this invention; and Figure 2 is a view similar to Figure 1 but showing a modification.

Although the tank may be of any desired peripheral shape, the arrangement of Figure 1 shows a cylindrical tank 3 mounted on foundation work 4 and provided with a hopper-shaped or frusto-conical bottom 5. The inlet to the tank takes the form of a series of ports 6 through the side wall thereof a short distance above the lowest part of the bottom and distributed around the periphery of the tank so as to provide uniform and relatively quiescent introduction of materials. An annular feeding chamber 7 surrounds the lower portion of the tank in the region of the inlet ports and is supplied with materials to be introduced through the two branches 8—8 extended from the supply pipe 9. This pipe may receive its supply by means of a pump 10 conveniently located in a chamber 11 built in association with the foundation work.

A hollow central column 12 is arranged within the tank and supported as by a spider 13 toward the bottom and by the cover 14 at the top, this cover being provided with overflowing ports 15 for the continuous discharge of liquid rising through the tank. The central column 12 serves to support a plurality of baffles within the tank providing a circuitous flow path. Baffles for this purpose may take a variety of shapes, one preferred form being shown in Figure 1, including funnel or cone-shaped elements 16 and 17—17, the first of which is arranged with its apex positioned upwardly and with its lower edge at about the level of the inlet ports 6. Two additional funnel-shaped baffles are arranged in spaced superimposed relation in an upright position somewhat above the lowermost baffle 16. It will be understood that any desired number of baffles such as those shown at 17 may be employed, as well as of certain other baffles hereinafter described, the number depending upon the conditions encountered, the shape and size of the tank and the rate of feed desired.

The baffling in the tank desirably includes additional baffles, such as the series of vertically superimposed and spaced annular frusto-conical elements 18 illustrated in Figure 1. The lowermost one of these is located in substantially the same horizontal plane with the baffle 16 and spaced therefrom to provide an annular flow channel of upwardly converging shape. The intermediate of these baffles 18 is located in a horizontal plane between the two funnel baffles 17 and the uppermost of the baffles 18 is located above the top funnel 17. As a result of this arrangement, the flow path, just beyond the lowermost baffle 18, again diverges from the central column, retaining its annular horizontal cross section, and, above the lower baffle 17 again converges toward the central column because of the path defined by the intermediate baffle 18. The same divergence and convergence of the annular flow path is repeated as the materials flow past the uppermost baffle 17 and the uppermost baffle 18.

The central column 12 is provided with ports 19 adjacent the neck of each of the funnel baffles 17 so as to discharge settled solids downwardly through the column and into the hopper at the bottom of the tank. Upright channels 20 having ports 20a communicating with the lower portion of the annular chamber surrounding each of the baffles 18 also serve to carry solids collected therein downwardly to be discharged into the hopper at the bottom of the tank.

Surrounding the tank in spaced relation is a large upright cylinder 21 receiving the overflow from ports 15 and directing the same downwardly into an additional settlement device having two series of alternate interleaving baffles 22 and 23 therein. These baffles 22 and 23 respectively project downwardly and upwardly from the top and bottom of the annular settlement chamber 24, and the baffles themselves are also annular, extending all the way around the central tank. The flow of materials through the annular settlement tank is therefore generally in a radially outward direction but downwardly and upwardly a number of times over the edges of the baffles 22 and 23. An annular collecting trough 25 surrounds the chamber 24 and receives overflow therefrom to be carried away as by pipe 26. One or more sets of withdrawal pipes 27, 28 and 29 are associated with the several chambers in the annular settlement tank 24 and serve to withdraw solids collected therein. These solids may be withdrawn through a single valved pipe 29 joining the main sludge discharge connection 30 which communicates with the bottom of the hopper 5. This main discharge may also be provided with a valve as at 31 operable if desired by means of a motor 32.

Attention is now called to the fact that the cylinder 21 surrounding the tank is mounted by means of bearings 33 so as to rotate about the axis of the tank. The cylinder is provided internally with reaction blades 34 curved or set at an angle to the vertical, so that upon contact therewith of the descending overflow, torque is imparted to the cylinder to rotate the same. An annular ring gear 35 is carried by the cylinder 21 and serves to actuate pinion 36 driving a generator 37 so as to produce current which may be employed for any desired purpose such as operating the motor for pump 10 at the inlet side of the equipment.

In operation, mixed liquid and solid materials, such as sewage, are delivered by means of pump 10 to the tank, the branch pipes 8—8 and the distribution ring 7 serving to provide for substantially uniform inlet of the mixed materials around the circumference of the tank through the several ports 6. These features aid in maintaining a condition as quiescent as possible so that the settlement action of gravity may immediately commence. The heaviest solids will very quickly settle to the bottom in the lower region of the tank and then the mass of fluid with the remaining solids therein progresses upwardly in the annular flow path between and around the several baffles. It is especially to be noted that the vertical dimension from baffle to baffle at any point in the flow path is small as compared with the total length of the flow path, in consequence of which particles need settle through only a relatively shallow depth of liquid, this being of importance in increasing the rate of settlement. As the solids strike the baffle surfaces they collect and mass together or agglomerate, and thus progressively increase in specific gravity in a manner to further aid the settlement action.

At the point where the flow path commences to diverge away from the central column just above the lowermost of the baffles 18, the solids then settle out of the moving column of liquid into the annular chamber surrounding this baffle 18. A similar action takes place adjacent the next turning point in the flow path at which the path again converges just above the lowermost funnel baffle 17. Here additional solids settle into the funnel, and in a like manner all the way to the top of the tank at different stages additional solids are settled out and separated from the flow path by means of the chambers formed by the baffles.

An important factor in providing for effective settlement during upward flow of materials is that the region just above each one of the baffles is of relatively large cross-sectional flow area, so that a quiescent condition is established, facilitating settlement.

The solids settling into the baffle chambers are discharged downwardly in the form of a more concentrated sludge either through the central column 12 or through the channels 20.

As the fluid overflows at the top of the tank it passes downwardly and strikes the reaction blades 34 described above, in order to rotate the cylinder 21 and generate power as by the generator 37, in the manner already set out.

Additional relatively fine solids are settled in the annular settlement chamber 24 surrounding the bottom portion of the tank, in which the flow, being in a radially outward direction, progressively becomes slower and in which the liquid therefore progressively becomes more quiescent. The solids or sludge are withdrawn from these chambers and combined with the sludge withdrawn from the bottom of the tank through pipe 30.

If desired, the withdrawal of settled sludge may be carried on continuously or may be effected only intermittently, as when delivering the sludge to a centrifuge operating on the batch-by-batch principle, for dewatering therein. A centrifuge suitable for this purpose is disclosed in my issued Patent No. 2,056,885, and it may be noted that in employing this invention in connection with sewage disposal I prefer to subject the settled solids to dewatering in such a centrifuge.

While the inlet of sludge may also be intermittent, the equipment is of especial advantage in being capable of operating with a continuous inlet.

By virtue of employing a relatively tall tank, for many purposes desirably of a height equal to at least twice the diameter, and by arranging baffles to provide a flow path of relatively small dimension paralleling the action of centrifugal force, a high degree of concentration of sludge may be obtained and this even with a rate of flow providing for handling considerable quantities of sewage.

The settlement capacity of my improved equipment is very high as compared with the more usual type of settlement tanks when calculated on the basis of the area occupied by the equipment, since in a plain gravity settlement tank or reservoir, a very large area is taken up because of the necessity for maintaining a reasonable shallow depth of liquid.

In general arrangement, the equipment of Figure 2 is similar to that of Figure 1, although the second form includes several modifications of importance.

In Figure 2 the tank 38 is again set up on foundation work as at 39, the tank being provided with a conical bottom 40 with an inlet 41 for admitting materials delivered from pump 42. A sludge discharge pipe 43 is arranged at the bottom, and within the tank a central column 44 is mounted by a spider 45 and the upper closure 46. This column serves to support a series of baffles 47, 48 and 49 cooperating with baffles 50 and 51, all annular, to define a flow path of annular horizontal cross-section but alternately converging and diverging shape. The baffles in this arrangement substantially completely define the flow path, which is in contrast with the arrangement of Figure 1 wherein chambers in communication with the tank are formed within certain of the baffles.

At the upper end overflow ports 52 deliver the discharging materials into a trough 53 from which pipe 54 extends downwardly for delivery of the liquid to a turbine 55 driving a generator 56. The outlet 57 from the turbine discharges into the inner annular sub-division of the annular settlement chamber 58 provided with upper and lower baffles 59 and 60 similar to those described above and serving to direct the flow upwardly and downwardly during the radially outward movement of the materials from the innermost pass to the outer collecting ring 61 from which the effluent is withdrawn by pipe 62. One or more series of discharge pipes 63 may serve to remove sludge from the several compartments in the annular settlement tank 58.

The arrangement of Figure 2 has in common with the arrangement of Figure 1 the characteristic of relatively rapid settlement of solids by gravity during the flow upwardly through the tank, this by virtue of the fact that the vertical dimension from baffle to baffle at substantially any point in the flow path is relatively small as compared with the total length of the flow path. Here, however, the solids are not separated out at various stages. Instead, the solids collect and agglomerate in larger masses on the surfaces of the baffles defining the lower sides of the inclined portions of the flow path. Upon agglomeration, and the consequent increase in specific gravity, the masses of sludge and solids settle more rapidly and quickly to the bottom hopper for withdrawal through the outlet 43.

In both forms it is further of importance that the direction of flow changes and that the horizontal cross-sectional area of the flow path alternately decreases and increases, resulting in change of rate of flow in different portions of the flow path. This action also aids in throwing out, precipitating or settling the solids within the baffles (as in Figure 1) or on the surfaces of the baffles (as in Figure 2).

Another advantage of importance, common to both arrangements, is that the development of power from the overflow liquid makes use of liquid drop from the top of the tank and still further accomplishes another purpose, i. e., aeration and agitation of the overflow materials. Such aeration and agitation is an aid to the settlement of solids, particularly of lighter specific gravity, so that these lighter components quite readily settle out in the annular settlement chamber around the bottom of the tank.

I claim:

1. A gravity settlement mechanism including a tank having a bottom and generally upright side walls, means for admitting mixed solid and liquid materials into a lower portion of the tank, outlet means for liquid in an upper region of the tank, superposed cone-like baffles in the central region of the tank positioned with their apices directed downwardly and in spaced relation, reversely inclined baffle walls projecting inwardly and upwardly from the side walls of the tank and each located in large part at a higher level than one of the cone-like baffles, the second mentioned baffles being centrally apertured, whereby to provide a generally annular flow path extended upwardly through the tank with portions alternately inclined radially inwardly and outwardly, and means for discharge of settled solids from the flow path at a plurality of points throughout the length of said path.

2. A gravity settlement mechanism including a tank having a bottom and generally upright side walls, means for admitting mixed solid and liquid materials into a lower portion of the tank, outlet means for liquid in an upper region of the tank, superposed cone-like baffles in the central region of the tank positioned with their apices directed downwardly and in spaced relation, reversely inclined baffle walls projecting inwardly and upwardly from the side walls of the tank and each located in large part at a higher level than one of the cone-like baffles, the second mentioned baffles being centrally apertured, whereby to provide a generally annular flow path extended upwardly through the tank with portions alternately inclined radially inwardly and outwardly, the cone-like baffles being upwardly open to collect solids settling from the liquid during flow thereof upwardly in the tank, and outlet means for discharging solids collected in the cone-like baffles.

3. A gravity settlement mechanism including a tank having a bottom and generally upright side walls, means for admitting mixed solid and liquid materials into a lower portion of the tank, outlet means for liquid in an upper region of the tank, superposed cone-like baffles in the central region of the tank positioned with their apices directed downwardly and in spaced relation, reversely inclined baffle walls projecting inwardly and upwardly from the side walls of the tank and each located in large part at a higher level than one of the cone-like baffles, the second mentioned baffles being centrally apertured, whereby to provide a generally annular flow path extended upwardly through the tank with portions alternately inclined radially inwardly and outwardly, the cone-like baffles being upwardly open to collect solids settling from the liquid during flow thereof upwardly in the tank, and means for withdrawing solids so collected within said cone-like baffles and for delivering the solids to the bottom of the tank.

JOSEPH S. PECKER.